United States Patent
Harris

(10) Patent No.: US 11,119,533 B1
(45) Date of Patent: Sep. 14, 2021

(54) ELECTRONIC DEVICE SCREEN ETCHING

(71) Applicant: Courtney Harris, San Diego, CA (US)

(72) Inventor: Courtney Harris, San Diego, CA (US)

( * ) Notice: Subject to any disclaimer, the term of this patent is extended or adjusted under 35 U.S.C. 154(b) by 0 days.

(21) Appl. No.: 16/819,924

(22) Filed: Mar. 16, 2020

(51) Int. Cl.
| | |
|---|---|
| *B32B 3/00* | (2006.01) |
| *G06F 1/16* | (2006.01) |
| *C03C 15/00* | (2006.01) |
| *G02B 1/14* | (2015.01) |
| *B32B 3/26* | (2006.01) |
| *B32B 27/06* | (2006.01) |
| *B32B 7/06* | (2019.01) |

(Continued)

(52) U.S. Cl.
CPC ............ *G06F 1/1609* (2013.01); *B32B 3/263* (2013.01); *B32B 3/266* (2013.01); *B32B 7/06* (2013.01); *B32B 7/12* (2013.01); *B32B 17/06* (2013.01); *B32B 27/06* (2013.01); *C03C 15/00* (2013.01); *G02B 1/14* (2015.01); *Y10T 428/24041* (2015.01)

(58) Field of Classification Search
CPC ........... B32B 3/263; B32B 3/266; B32B 7/06; B32B 7/12; B32B 17/06; B32B 27/06; B32B 2457/20; B32B 2457/208
See application file for complete search history.

(56) References Cited

U.S. PATENT DOCUMENTS

| | | |
|---|---|---|
| 10,365,689 B2 | 7/2019 | Park |
| 2010/0271324 A1 | 10/2010 | Hayes |

(Continued)

FOREIGN PATENT DOCUMENTS

| | | |
|---|---|---|
| CN | 201979752 | 9/2011 |
| CN | 103922603 | 7/2014 |

(Continued)

OTHER PUBLICATIONS

Website https://www.aliexpress.com/item/32857047601.html, AliExpress iHaitun 6D Glass for iphone XS MAX XR, date unknown.

(Continued)

*Primary Examiner* — Elizabeth E Mulvaney
(74) *Attorney, Agent, or Firm* — Kevin Keener; Stephen Presutti

(57) ABSTRACT

An electronic device includes a device screen having an active region where the screen can provide output to a user or receive input from the user. A screen outer layer, such as a removable screen protector, is positionable between the device screen and the user and capable of passing the output or the input therethrough. The screen outer layer includes an active region that corresponds to the active region of the device screen, and the screen outer layer has an etched marking in the active region of the screen outer layer. In one version, the etched marking is provided on the inner surface. A method of using an electronic device includes installing on a device screen a screen outer layer, wherein the screen outer layer includes an active region that corresponds to the active region of the device screen, and wherein the screen outer layer has an etched marking in the active region of the screen outer layer. In one version, the etched marking is provided by a laser on an inner surface of the screen outer layer, wherein the etched marking is not visible when the device screen is powered, and wherein the etched marking is visible when the device screen is off or black.

16 Claims, 3 Drawing Sheets

(51) Int. Cl.
    *B32B 17/06*     (2006.01)
    *B32B 7/12*     (2006.01)

(56) References Cited

U.S. PATENT DOCUMENTS

| | | |
|---|---|---|
| 2011/0299168 A1 | 12/2011 | Combs |
| 2014/0234594 A1 | 8/2014 | Ito |
| 2016/0016845 A1 | 1/2016 | Cho |
| 2016/0152001 A1* | 6/2016 | Su .................... B32B 27/20 |
| | | 428/354 |
| 2016/0311246 A1* | 10/2016 | Hill .................. C23C 14/042 |
| 2017/0212051 A1 | 7/2017 | De Lacerda |
| 2020/0319677 A1* | 10/2020 | Canning ............... G06F 3/041 |

FOREIGN PATENT DOCUMENTS

| | | |
|---|---|---|
| CN | 104194481 | 12/2014 |
| CN | 204053241 | 12/2014 |
| JP | 2017-32939 | 2/2017 |

OTHER PUBLICATIONS

Website https://greenonionssupply.com/special-orders/custom-engraving/, Green Onions Supply, date unknown.

* cited by examiner

ELECTRONIC DEVICE SCREEN ETCHING

BACKGROUND

In recent years, the use of mobile phones, tablets, and the like has become a ubiquitous part of society. Almost everyone is in nearly constant contact with one or more of their portable devices. Because of the constant use and the increasing importance of the device, the maintenance of an operable device is becoming increasingly important.

One of the primary problems that can occur with a mobile electronic device is damage to the screen of the device. The screen is not only used to view images and videos, it is often the manner in which a user interacts with the device. For example, most mobile electronic devices use a touch screen that is both an input and an output device. A user can control the mobile device and enter information into the mobile device through touch gestures using a finger or a stylus. However, the touch screen is typically made of glass and can easily become damaged, such as by being scratched or shattered. To help prevent this damage to the screen, a user will often cover the screen with a screen protector. Conventional screen protectors are made of plastic, such as polyethylene terephthalate or thermoplastic polyurethane, or tempered glass that is similar to the material of the touch screen.

While screen protectors can help protect the underlying screen of a mobile electronic device, conventional screen protectors suffer from not being customizable. Many users of mobile electronic devices enjoy displaying their identity, their fashion or style, their passions and likes, and/or expressing their individuality. To do this a user will often purchase a selected or customized protective case for their mobile electronic device. Users can also etch images, such as text or graphics, onto cases or non-functional areas of their mobile electronic device. However, such customization of screens and screen protectors, particularly in the active region of the screen, has heretofore not been an available option for users.

Therefore, there is a need for an improved mobile electronic device screen protector that is customizable. There is a further need for an improved mobile electronic device screen protector that can be etched. There is a further need for a mobile electronic device screen protector that can be etched with an image in the active region of the mobile device. There is further a need for a mobile electronic device screen protector that can be treated to improve its effectiveness and/or appearance.

SUMMARY

The present invention satisfies these needs. In one aspect of the invention, an improved screen protector is disclosed.

In another aspect of the invention, an improved method of treating a screen protector is disclosed.

In another aspect of the invention, a screen protector is etched with an image.

In another aspect of the invention, a screen or screen protector is etched with an image in the active region.

In another aspect of the invention, a screen or screen protector is etched with an image in the active region, the image being visible when an underlying screen is off and not visible when the underlying screen is on.

In another aspect of the invention, a screen protector is etched with an image on the backside or inner surface of the screen protector.

In another aspect of the invention, a screen protector is treated in a manner that improves the effectiveness of the screen protector.

In another aspect of the invention, an electronic device comprises a device screen having an active region where the screen can provide output to a user or receive input from the user, and a screen outer layer positionable between the device screen and the user and capable of passing the output or the input therethrough, wherein the screen outer layer includes an active region that corresponds to the active region of the device screen, and wherein the screen outer layer has an etched marking in the active region of the screen outer layer.

In another aspect of the invention, an electronic device comprises a device screen having an active region where the screen can provide output to a user or receive input from the user, and a screen outer layer positionable between the device screen and the user and capable of passing the output or the input therethrough, wherein the screen outer layer includes an active region that corresponds to the active region of the device screen, and wherein the screen outer layer has an etched marking in the active region of the screen outer layer, and wherein the screen outer layer comprises an inner surface adapted to face the device screen and an outer surface adapted to face the user, and wherein the etched marking is provided on the inner surface.

In another aspect of the invention, an electronic device comprises a device screen having an active region where the screen can provide output to a user or receive input from the user, and a screen outer layer positionable between the device screen and the user and capable of passing the output or the input therethrough, wherein the screen outer layer includes an active region that corresponds to the active region of the device screen, and wherein the screen outer layer has an etched marking in the active region of the screen outer layer, wherein the screen outer layer is a removable screen protector comprising tempered glass, and wherein the etching is a laser etching and wherein the laser etching causes the tempered glass to shatter in a manner that causes light to diffuse through the screen outer layer.

In another aspect of the invention, a screen outer layer is provided for use with an electronic device comprising a device screen having an active region where the screen can provide output to a user or receive input from the user. The screen outer layer comprises an inner surface and an outer surface, the screen outer layer being positionable between the device screen and the user and capable of passing the output or the input therethrough with the inner surface facing the device screen and the outer surface facing the user, wherein the screen outer layer includes an active region that corresponds to the active region of the device screen, and wherein the screen outer layer has an etched marking in the active region of the screen outer layer.

In another aspect of the invention, a screen outer layer is provided for use with an electronic device comprising a device screen having an active region where the screen can provide output to a user or receive input from the user. The screen outer layer comprises an inner surface and an outer surface, the screen outer layer being positionable between the device screen and the user and capable of passing the output or the input therethrough with the inner surface facing the device screen and the outer surface facing the user, wherein the screen outer layer includes an active region that corresponds to the active region of the device screen, and wherein the screen outer layer has an etched marking in the active region of the screen outer layer, wherein the etched marking is provided on the inner surface.

In another aspect of the invention, a screen outer layer is provided for use with an electronic device comprising a device screen having an active region where the screen can provide output to a user or receive input from the user. The screen outer layer comprises an inner surface and an outer surface, the screen outer layer being positionable between the device screen and the user and capable of passing the output or the input therethrough with the inner surface facing the device screen and the outer surface facing the user, wherein the screen outer layer includes an active region that corresponds to the active region of the device screen, and wherein the screen outer layer has an etched marking in the active region of the screen outer layer, and wherein the etching is a laser etching of tempered glass.

In another aspect of the invention, a method of using an electronic device comprises providing an electronic device comprising a device screen having an active region where the screen can provide output to a user or receive input from the user; and installing on the device screen an outer layer between the device screen and the user and capable of passing the output or the input therethrough, wherein the screen outer layer includes an active region that corresponds to the active region of the device screen, and wherein the screen outer layer has an etched marking in the active region of the screen outer layer.

In another aspect of the invention, a method of using an electronic device comprises providing an electronic device comprising a device screen having an active region where the screen can provide output to a user or receive input from the user; and installing on the device screen an outer layer between the device screen and the user and capable of passing the output or the input therethrough, wherein the screen outer layer includes an active region that corresponds to the active region of the device screen, and wherein the screen outer layer has an etched marking in the active region of the screen outer layer, wherein the etched marking is provided by a laser on an inner surface of the screen outer layer.

In another aspect of the invention, a method of using an electronic device comprises providing an electronic device comprising a device screen having an active region where the screen can provide output to a user or receive input from the user; and installing on the device screen an outer layer between the device screen and the user and capable of passing the output or the input therethrough, wherein the screen outer layer includes an active region that corresponds to the active region of the device screen, and wherein the screen outer layer has an etched marking in the active region of the screen outer layer, wherein the etched marking is not visible when the device screen is powered, and wherein the etched marking is visible when the device screen is off or black.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a layer of a screen for an electronic device. In particular, the invention relates to etching an image on a layer of a screen, such as a screen protector, for a mobile electronic device. Although the invention is illustrated and described in this context, the present invention can be used in other ways, as would be readily apparent to those of ordinary skill in the art. Accordingly, the present invention should not be limited just to the examples and embodiments described herein.

Figure 1:
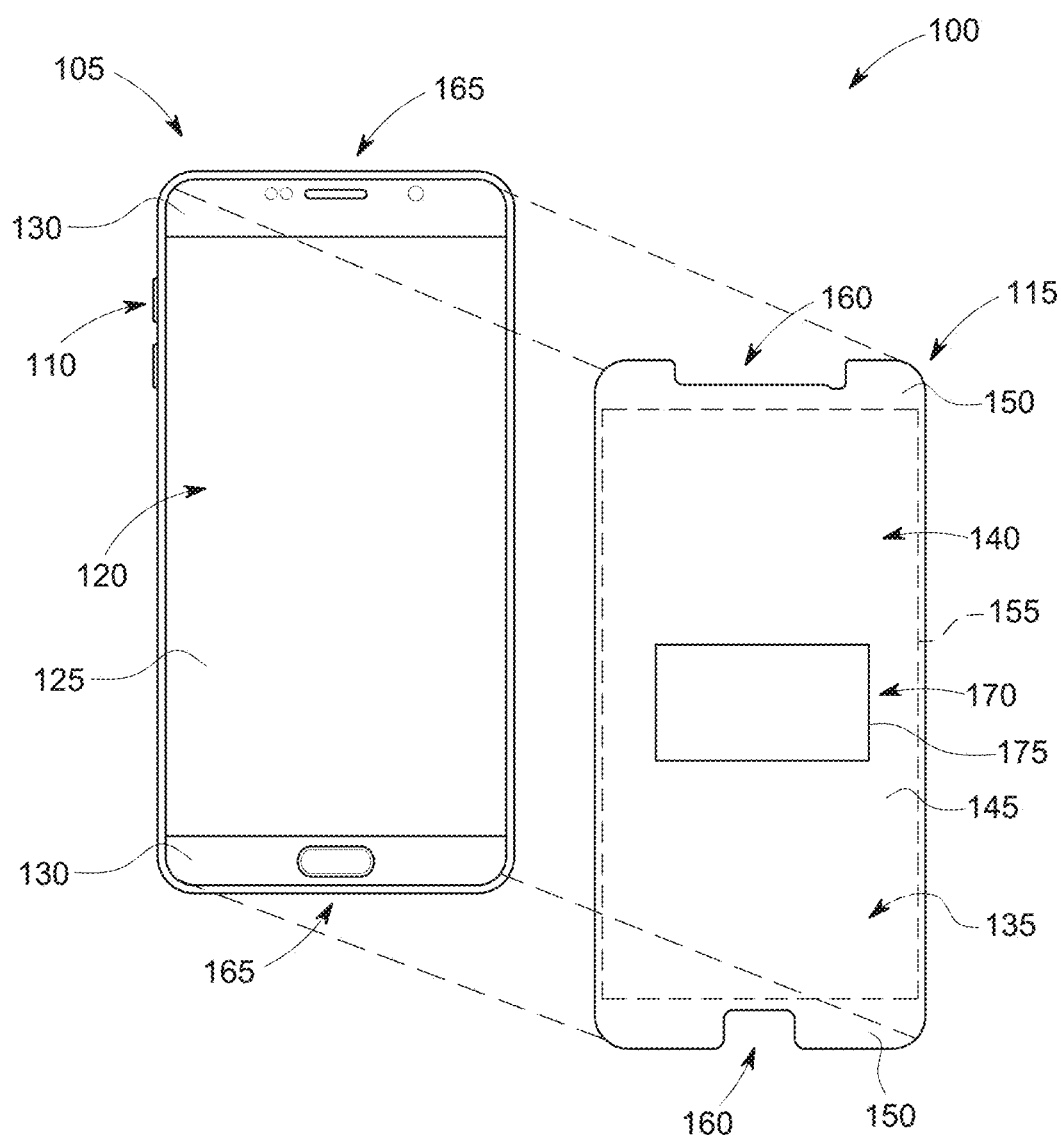
FIG. 1 is a schematic perspective view of an electronic system having a screen outer layer according to the invention.

FIG. 1 shows an electronic system 100 made up of an electronic device 105, such as a mobile electronic device, having a device screen 110 and a screen outer layer 115. By mobile electronic device it is meant any portable electronic device having a screen for viewing information, images, and/or videos. Examples of electronic devices 105 include mobile phones, a smart phones, tablets, personal digital assistants, laptops, game consoles, point-of-sale systems, displays on the console of a car or truck, video screens on an airplane, televisions, smart home appliances, medical device displays, internet of things (IoT) displays, and the like, and combinations thereof. The device screen 110 may be an interactive screen such as a touch screen with which a user may interact with the mobile electronic device by making simple or multiple gestures using one or more of the user's fingers, a stylus, a glove, and/or the like. Touch screens are typically capacitive having a panel of glass or other insulator coated with a transparent conductor. Touching the surface 120 of the device screen 110 either directly or through the screen outer layer 115 by an electrical conductor, such as human skin or a stylus, distorts the electrostatic field of the device screen 110, and the distortion creates a change in capacitance. This change in capacitance can be measured and interpreted by the operating system of the mobile electronic device. Alternative types of touch screens include resistance, ultrasonic, optical, liquid crystal displays, in-plane switching liquid crystal displays, organic light emitting diode, active-matrix organic light emitting diode, capacitive touchscreen, resistive touchscreen, thin film diode, color super twisted nematic, and others similar technologies known in the art. Alternatively, the screen 110 can be a conventional video screen that is an output device not having touch capabilities.

The device screen 110 of the electronic device 105 includes different regions. For example, the device screen 110 can include an active region 125 and one or more inactive regions 130. The active region 125 is any region of the device screen 110 where an output is displayed and/or where an input may be received. The inactive regions 130 are regions of the device screen 110 where no output from the mobile electronic device is displayed and/or where no input may be received. The inactive regions 130 are sometimes referred to as the bezel. The inactive regions 130 are typically black or otherwise darkened and often are used to cover or hide underlying circuitry of the electronic device 105. Since the inactive regions 130 of the device screen 110 are not involved in the output display and/or the input areas, such as the active areas of a touch screen, the inactive regions 130 are sometimes etched or otherwise marked with an image, such as a logo or the like. The markings in these inactive regions 130 do not interfere with an image being displayed on the device screen 110 and/or do not interfere with a user touching the active region 125 of the device screen 110. However, as device screen 100 technology advances the inactive regions 130 are becoming smaller and smaller.

The screen outer layer 115 comprises a layer of transparent material that can be affixed directly or indirectly onto the surface 120 of the device screen 110. For example, in one version, the screen outer layer 115 is a sheet of thin material that serves as a screen protector for the device screen 110. By outer it is meant that the screen outer layer 115 is located outside the device screen 110 or between the device screen 110 and the user of the electronic device 105. The screen outer layer 115 includes an inner surface 135 and an outer surface 140. By outer is it not meant that the screen outer layer 115 must be the outermost layer or component, and the screen outer layer 115 may have an addition layer or coating provided on its outer surface 140. The outer layer 115 is adapted to directly or indirectly contact or be associated with the device screen 110 so that output from the device screen 110 can be transferred through the screen outer layer 115 to the outer surface 140 of the screen outer layer 115 and/or input to the outer surface 140 of the screen outer layer 115 can be transferred through the screen outer layer 115 to the device screen 110. The screen outer layer 115 includes a first region 145 that corresponds with the active region 125 of the underlying device screen 110 when the screen outer layer 115 is position thereon. The screen outer layer 115 also includes a second region 150 that corresponds with the one or more inactive regions 130 of the underlying device screen 110. In the version shown in FIG. 1, the screen outer layer is a continuous single piece of transparent material. In FIG. 1, an imaginary line 155 illustrates the difference between the first region 145 and the second region 150. Alternatively, an actual line and/or a different shading or the like can be provided on the screen outer layer 115 to show the difference between the first region 145 and the second region 150. The screen outer layer 115 may also include one or more cutout portions 160 where material has been removed so that portion does not cover a feature 165, such as a speaker and/or microphone, on the mobile electronic device 105.

In one version, the screen outer layer 115 comprises a screen protector made of material designed to protect the device screen 110 from damage or breakage without significantly hindering the usefulness of the device screen 110. The screen protector may be any transparent layer that is installable onto and/or removeable from the device screen 110 and that serves to protect the device screen 110 from damage, debris, and the like. The screen protector may be separately purchasable or may be provided with the mobile electronic device 105. For example, the screen outer layer 115 may be made of a plastic, such as polyurethane or thermoplastic polyurethane, polyethylene terephthalate, and/or the like, or of a glass material, such as tempered glass, laminated glass, laminated tempered glass, toughened glass, or the like, including multilayered outer layers such as those available from Valor Communications®. Plastic screen protectors are less expensive, thinner, and more flexible than glass screen protectors, and are typically about 0.1 mm thick. Glass screen protectors are thicker, ranging from about 0.3 to about 0.5 mm thick, and are better than plastic at resisting scratches but can themselves shatter or crack.

As shown in FIG. 1, in one version of the invention, the screen outer layer 115 includes a marking 170 thereon and/or thereinto. In one version, the marking 170 can include an image 175. The image 175 can be in any desirable form. For example, the image 175 may be one or more of text, script, picture, drawing, logo, shape, name, design, graphics, color, icon, photo, print art, clipart, painting, and the like. In FIG. 1, the image 175 is shown as a simple rectangle for simplicity but may alternatively be any of the above images or any other image. The image allows the screen outer layer 115 to be marked in a manner that is desirable to a user. For example, a user may be able to mark the screen outer layer 115 with the user's name or a graphic that is meaningful to the user, such as a sports team emblem or the like. The image 175 may be positioned anywhere on the screen outer layer 115 including in the first region 145 and/or in the second region 150. The image 175 may range in size from microscopic to all or nearly all of the screen outer layer 115.

The marking 170 can be applied to the screen outer layer 115 in any manner, such as laser marking, laser engraving, and/or laser etching. For example, in one version, the marking 170 can be provided by etching and in particular by laser etching. In this version, the screen outer layer 115 can be made of glass, such as tempered glass. The screen outer layer 115 is marked by etching, such as by laser etching. Laser etching involves the removal of a portion of the glass surface by a laser that penetrates the surface of the glass. Alternatively, chemical etching may be used for providing the marking 170.

In one version, the marking 170 comprises an etching that is applied to the screen outer layer 115 in a manner that reduces interference with the input function of the screen outer layer 115. In this version, the etching is applied to the inner surface 135 of the screen outer layer 115. For example, when the screen outer 115 is applied to a touch screen device screen 110 the outer surface 140 of the screen outer layer 115 functions as the touch surface. By creating the marking 170 by etching the inner surface 135, the outer surface 140 of the screen outer layer 115 is maintained smooth. The resulting image 175 that has been etched into the inner surface 135 cannot be felt or detected by the user's finger passing over the outer surface 140 of the screen outer layer 115. This allows the image 175 to be applied within the first region 145 of the screen outer layer 115 and thus being within the active region 125 of the device screen 110 without being noticeable by the touch of the user who is interacting with the electronic device 105.

Figure 2A:
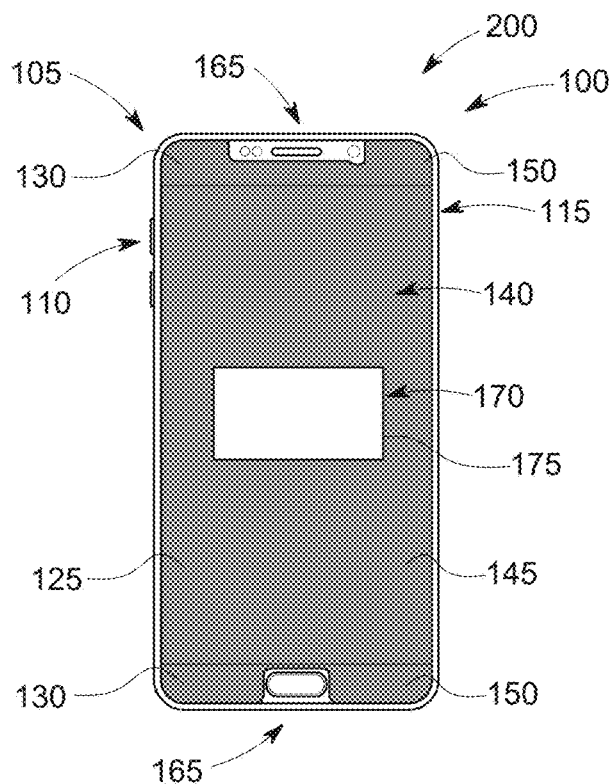
FIG. 2A is a schematic front view of the screen outer layer of FIG. 1 on an electronic device with a dark background display.

In addition, as shown in FIG. 2A, the marking 170 can comprise an etching that is applied to the screen outer layer 115 in a manner that reduces interference with the output function of the device screen 110 of the electronic device 105. For example, by applying the marking 170 by etching the inner surface 135 of the screen outer layer 115, the resulting image 175 can be selectively visible. FIG. 2A shows an assembled system 200 with an outer layer 115 that has been etched with an image 175 on its inner surface 135, and the outer layer 115 has been applied onto the device screen 110 of an electronic device 105. The image 175 is visible when the device screen is dark 205, such as by being powered down, asleep, or displaying a black or dark background. When the device screen 110 displays a graphical representation other than a dark background, such as a background picture 210, as shown in FIG. 2B, or a menu 215, as shown in FIG. 2C, the etched image 175 is less visible or not visible at all, as shown by the dashed line 220 indicating the location of the hidden image.

Figure 2B:
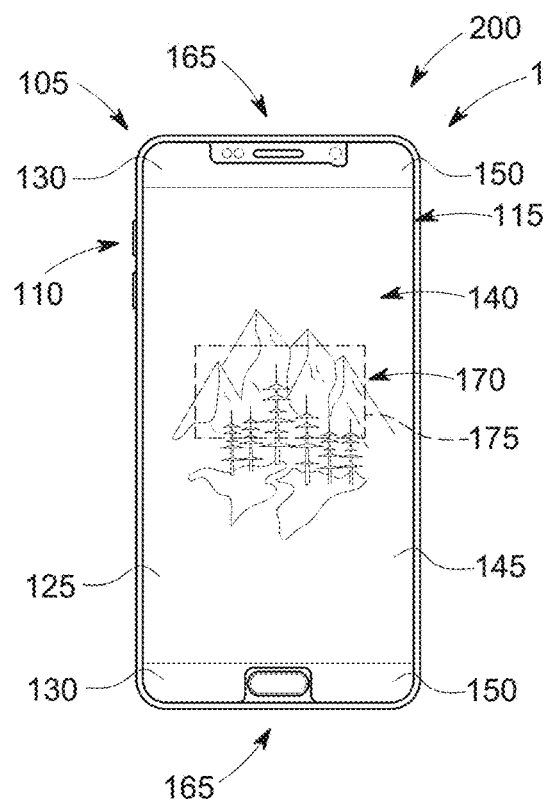
FIG. 2B is a schematic front view of the screen outer layer of FIG. 1 on an electronic device with an active display of a background image.
Figure 2C:
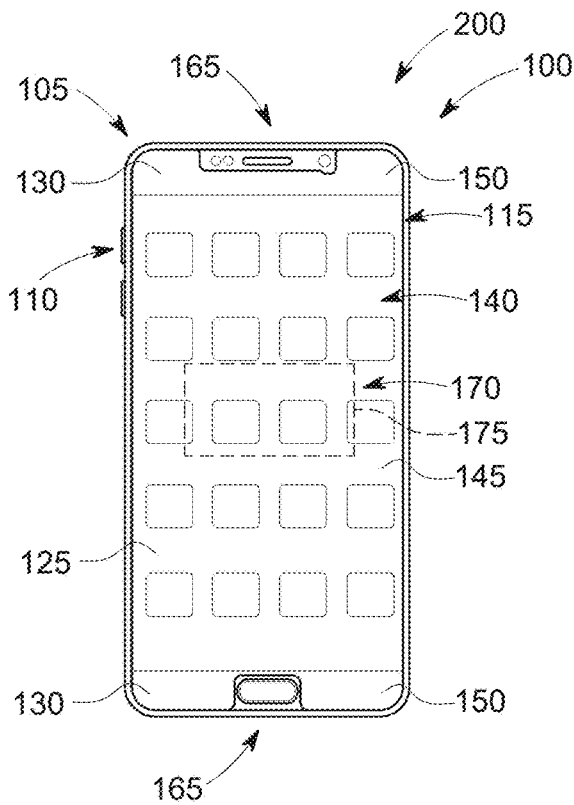
FIG. 2C is a schematic front view of the screen outer layer of FIG. 1 on an electronic device with an active display of a menu image.

The effects of FIGS. 2A through 2C, can be achieved merely by etching the outer layer 115 is a desired manner, such as by laser etching. The marking 170 can be laser etched in varying degrees. For example, if laser power is turned to a relatively high level, it will etch deeper into the outer layer 115, making the marking 170 more prominent and even visible when the screen is turned on. However, if the laser is turned to a lower power, the etch may be less visible. Thus, the power can be selected to provide an etch visible at all times, an etch visible when the screen is dark, or an etch that is not visible or only slightly visible. In addition to laser power, the speed of the laser etch can be adjusted to control the degree of etching. The speed at which the beam moves across the material is also a factor in determining the degree of etching. For example, changing the proportion of time, i.e. the duty cycle, the laser is turned on during each pulse, the power delivered to the engraving surface can be controlled appropriately for the material.

The degree of etching depends on the laser being used. Many types of lasers can be used, as would be recognized by those skilled in the art. Lasers range by laser tube wattage, and typically range from about 10 watts, for desktop hobbyists, to about 100,000 watts for industrial cutting. The settings of whichever laser is used can be selected to make the desired etch. Additionally, lasers from different manufacturers have different laser tube technologies, so the power and speed settings on one 60 watt laser may not be the same settings as another 60 watt laser from a different manufacturer. The higher the wattage of laser the lower the power setting should be so it does not cut through the glass material. In one particular version, a K40 40-watt laser can be used at a power setting of 50% and a speed setting of 50% for a general etch, with those settings being adjustable up and down as desired to provide the desired degree of etch. In another particular version, a Preenex 60-watt laser can be used at a power setting of 25% and a speed setting of 100% for a general etch, with those settings being adjustable up and down as desired to provide the desired degree of etch. In another particular version, a LaserPro laser can be used at a power setting of 20% to 35% and a speed setting of 50% to 100% for a general etch, with those settings being adjustable up and down as desired to provide the desired degree of etch. With all of these the degree of etching can typically be adjusted by changing the above settings by a small amount, often by 1% to 2% up or down.

In one version, the marking 170 can be an etching of at least a portion of the inner surface 135 of the screen outer layer 115 that causes light to diffuse through the screen outer layer 115. For example, the etching can be performed in a manner that causes the glass of the screen outer layer 115 to shatter in a way that causes a desirable effect. For example, the etching can be performed in a manner where the micro-fractures are placed into the surface of the outer layer 115. The micro-fractures do not penetrate through the outer layer 115. For a glass outer layer 115, the laser process removes minute glass shards from the surface, which then diffuses the light when passing through.

Stone and glass do not turn gaseous very easily. Accordingly, this traditionally makes them generally a better candidate for other forms of engraving, such as sandblasting or cutting using diamonds and water. However, it has been discovered that when a laser hits glass or stone, something else interesting happens; it fractures. Pores in the surface expose natural grains and crystalline "stubs" which, when heated very quickly, can separate a microscopic sized "chip" from the surface because the hot piece is expanding relative to its surroundings. Thus, the use of lasers to engrave on glass, especially if the power, speed and focus are desirably selected, can result in excellent and surprising results.

Figure 3A:
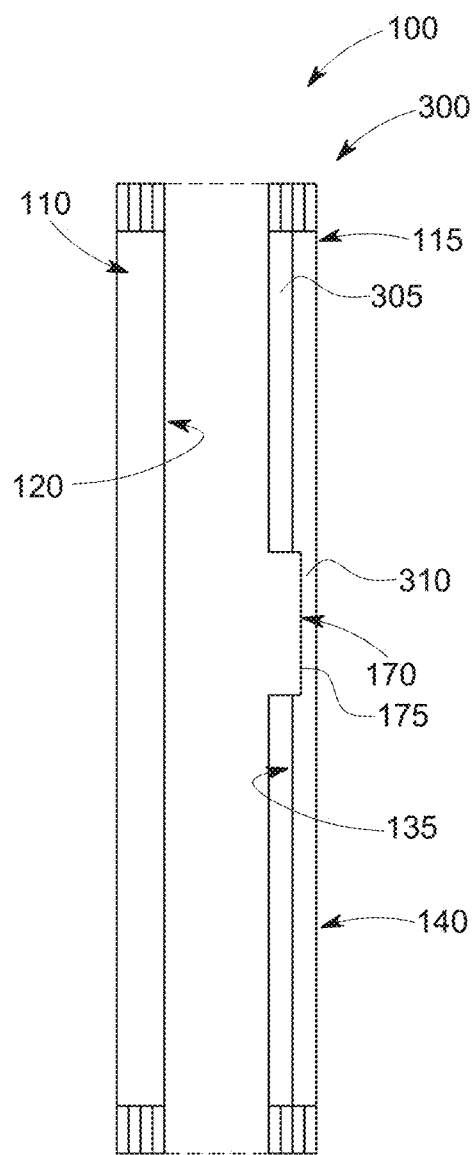
FIG. 3A is a schematic side view of the screen outer layer of FIG. 1 as a screen protector.
Figure 3B:
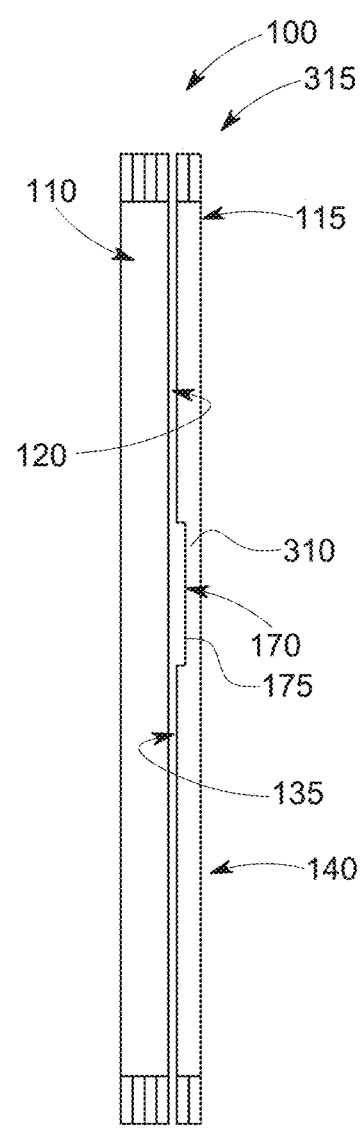
FIG. 3B is a schematic side view of the screen outer layer of FIG. 1 as a permanently integrated portion of an electronic device screen.

FIGS. 3A and 3B illustrate different versions of the screen outer layer 115. In FIG. 3A, the screen outer layer 115 is in the form of a screen protector 300. An adhesive layer 305 is provided on the inner surface 135 of the screen outer 115. During the etching process in the formation of the marking 170, the inner surface 135 is etched through the adhesive layer 135. The etched marking 170 creates an indentation 310 into the inner surface 135 of the screen outer layer 115. The screen outer layer 115 is then applied onto the device screen 110 and held there by the adhesive 305. The screen protector 300 can be removed from the device screen 110 and replaced with the same or a different screen protector 300. FIG. 3B shows a permanently attached screen outer layer 315. The permanently attached screen outer layer 315 includes an outer layer 115 that has been etched on its inner surface 135 and is then permanently attached to the device screen 110 either at the time of manufacture or at a later date.

The image 175 to be etched into the screen outer layer 115 can be customizable or can be a stock image. For example, a customer can request certain text or can provide a desired graphical image and the screen outer layer 115 can be customized based on the order. Alternatively, screen outer layers 115 can be premarked in bulk with particular images, such as a graphical design, a scripted quotation, a logo, and/or the like. A user can have multiple outer layers 115 each etched with the same image 175 for replacement of old outer layers 115. Alternatively, a user can have multiple outer layers 115 each with different images 175 so that the user can select the desired image to be used for a certain period of time.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Therefore, any appended claims should not be limited to the description of the preferred versions contained herein and should include all such alterations, permutations, and equivalents as fall within the true spirit and scope of the present invention.

What is claimed is:

1. An electronic device comprising:
   a device screen having an active region where the screen can provide output to a user or receive input from the user;
   a screen outer layer positionable between the device screen and the user and capable of passing the output or the input therethrough;

wherein the screen outer layer includes an active region that corresponds to the active region of the device screen, and wherein the screen outer layer has an etched marking in the active region of the screen outer layer;

wherein the screen outer layer comprises an inner surface adapted to face the device screen and an outer surface adapted to face the user, and wherein the etched marking is provided on the inner surface;

wherein the inner surface has an adhesive layer; and wherein the etched marking is formed by etching the inner surface through said adhesive layer.

2. An electronic device according to claim 1 wherein, the etched marking comprises an image of one or more of text, a script, a picture, a drawing, a logo, a shape, a name, a design, graphics, a color, an icon, a photo, print art, clipart, and a painting.

3. An electronic device according to claim 1 wherein the etching is a laser etching.

4. An electronic device according to claim 3 wherein the etching is visible when the device screen is off or black.

5. An electronic device according to claim 1 wherein the screen outer layer is a removable screen protector.

6. An electronic device according to claim 5 wherein the screen outer layer is a removable screen protector comprising tempered glass.

7. An electronic device according to claim 6 wherein the etching is a laser etching and wherein the laser etching causes the tempered glass to shatter in a manner that causes light to diffuse through the screen outer layer.

8. An electronic device according to claim 5 wherein the removable screen protector comprises plastic.

9. An electronic device according to claim 1 wherein a plurality of screen outer layers are provided, wherein each screen outer layer is removable, and wherein each screen outer layer has a different etched marking in its first region.

10. An electronic device according to claim 1 wherein the device screen further has an inactive region and wherein the screen outer layer further includes an inactive region that corresponds to the inactive region of the device screen.

11. A screen outer layer for use with an electronic device comprising a device screen having an active region where the screen can provide output to a user or receive input from the user, the screen outer layer comprising:

an inner surface and, an outer surface, the screen outer layer being positionable between the device screen and the user and capable of passing the output or the input therethrough with the inner surface facing the device screen and the outer surface facing the user;

wherein the screen outer layer includes an active region that corresponds to the active region of the device screen, and wherein the screen outer layer has an etched marking in the active region of the screen outer layer;

wherein the etched marking is provided on the inner surface;

wherein the outer layer is a removeable screen protector and wherein the inner surface has an adhesive layer; and wherein the etched marking is formed by etching the inner surface through said adhesive layer.

12. A screen outer layer according to claim 11 wherein the etching is a laser etching.

13. A screen outer layer according to claim 11 wherein the outer layer is a removeable screen protector comprising tempered glass.

14. A screen outer layer according to claim 13 wherein the etching is a laser etching and wherein the laser etching causes the tempered glass to shatter in a manner that causes light to diffuse through the screen outer layer.

15. A method of using an electronic device, the method comprising:

providing an electronic device comprising a device screen having an active region where the screen can provide output to a user or receive input from the user; and installing on the device screen a screen outer layer between the device screen and the user and capable of passing the output or the input therethrough;

wherein the screen outer layer includes an active region that corresponds to the active region of the device screen, and wherein the screen outer layer has an etched marking in the active region of the screen outer layer;

wherein the screen outer layer has an inner surface and an outer surface;

wherein the inner surface faces the device screen and the outer surface faces the user;

wherein the etched marking is provided on the inner surface;

wherein the outer layer is a removeable screen protector and wherein the inner surface has an adhesive layer; and wherein the etched marking is formed by etching the inner surface through said adhesive layer.

16. A method according to claim 15 wherein the etched marking is etched by a laser, wherein the etched marking is not visible when the device screen is powered, and wherein the etched marking is visible when the device screen is off or black.

* * * * *